United States Patent
Williams et al.

(10) Patent No.: US 9,678,736 B2
(45) Date of Patent: Jun. 13, 2017

(54) METHOD AND SYSTEM FOR UPDATING A SOFTWARE IMAGE AT A CLIENT DEVICE

(75) Inventors: Ksatria G. Williams, Garden Grove, CA (US); Loren Leung, Rosemead, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1718 days.

(21) Appl. No.: 12/878,827

(22) Filed: Sep. 9, 2010

(65) Prior Publication Data

US 2011/0067022 A1    Mar. 17, 2011

Related U.S. Application Data

(60) Provisional application No. 61/242,327, filed on Sep. 14, 2009.

(51) Int. Cl.
  *G06F 9/445*    (2006.01)
  *G06F 11/14*    (2006.01)
  *H04L 29/06*    (2006.01)

(52) U.S. Cl.
  CPC ............ *G06F 8/63* (2013.01); *G06F 9/44505* (2013.01); *G06F 11/1417* (2013.01); *H04L 67/42* (2013.01)

(58) Field of Classification Search
  CPC ... G06F 9/44505; G06F 11/1417; H04L 67/42
  USPC .................................................. 709/220–222
  See application file for complete search history.

(56) References Cited

U.S. PATENT DOCUMENTS

| | | |
|---|---|---|
| 6,757,837 B1 | 6/2004 | Platt et al. |
| 7,149,889 B2 | 12/2006 | Stalker et al. |
| 2004/0243998 A1 * | 12/2004 | Collins ..................... G06F 8/60 717/178 |
| 2004/0249907 A1 * | 12/2004 | Brubacher .......... H04L 41/0816 709/220 |
| 2005/0108391 A1 | 5/2005 | Boss et al. |
| 2005/0108757 A1 * | 5/2005 | Lee ..................... H04N 7/17309 725/50 |
| 2006/0143432 A1 * | 6/2006 | Rothman .............. G06F 9/4416 713/2 |
| 2006/0212537 A1 * | 9/2006 | Hans et al. ................... 709/217 |
| 2006/0236320 A1 | 10/2006 | Chen et al. |
| 2007/0118617 A1 * | 5/2007 | Lee et al. ...................... 709/219 |
| 2007/0205375 A1 * | 9/2007 | Ward ..................... B82Y 10/00 250/398 |
| 2007/0294228 A1 | 12/2007 | Kawana |
| 2008/0079984 A1 * | 4/2008 | Gallucci ...................... 358/1.15 |
| 2009/0006534 A1 | 1/2009 | Fries et al. |
| 2009/0070174 A1 * | 3/2009 | Cei ........................ G06Q 10/02 705/5 |

(Continued)

OTHER PUBLICATIONS

European Search Report and search opinion dated Dec. 7, 2010 in European Patent Application No. 10251599.6 filed Sep. 14, 2010 by Ksatria G. Williams et al.

*Primary Examiner* — Jeong S Park

(74) *Attorney, Agent, or Firm* — Harness, Dickey & Pierce, PLC

(57) ABSTRACT

A system and method for communicating software images includes a server device that stores a software image therein and a client device that communicates a client device identifier to the server device through a network. The server communicates the software image to the client device through the network. The client device operates based on the software image.

25 Claims, 13 Drawing Sheets

(56) References Cited

U.S. PATENT DOCUMENTS

2009/0150882 A1    6/2009  Dechovich et al.
2010/0205375 A1*   8/2010  Challener ........... G06F 12/0868
                                                711/118
2010/0313199 A1*  12/2010  Chen ................... G06F 9/5055
                                                717/177

* cited by examiner

METHOD AND SYSTEM FOR UPDATING A SOFTWARE IMAGE AT A CLIENT DEVICE

CROSS-REFERENCE TO RELATED APPLICATIONS

This application claims the benefit of U.S. Provisional Application No. 61/242,327, filed on Sep. 14, 2009. The entire disclosure of the above application is incorporated herein by reference.

TECHNICAL FIELD

The present disclosure relates generally communicating between a server and a client device, and, more specifically, to providing software images from the server device to the client device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

SUMMARY

The present disclosure allows the use of simplified clients to provide a consistent customer experience at each display associated with a client device.

In one aspect of the disclosure, a method includes storing a software image on a server device, communicating a client device identifier to the server device through a network, communicating the software image to the client device through the network and operating the client device based on the software image.

In a further aspect of the disclosure, a system for communicating software images includes a server device that stores a software image therein and a client device that communicates a client device identifier to the server device through a network. The server communicates the software image to the client device through the network. The client device operates based on the software image.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in anyway.

DETAILED DESCRIPTION

Figure 1:
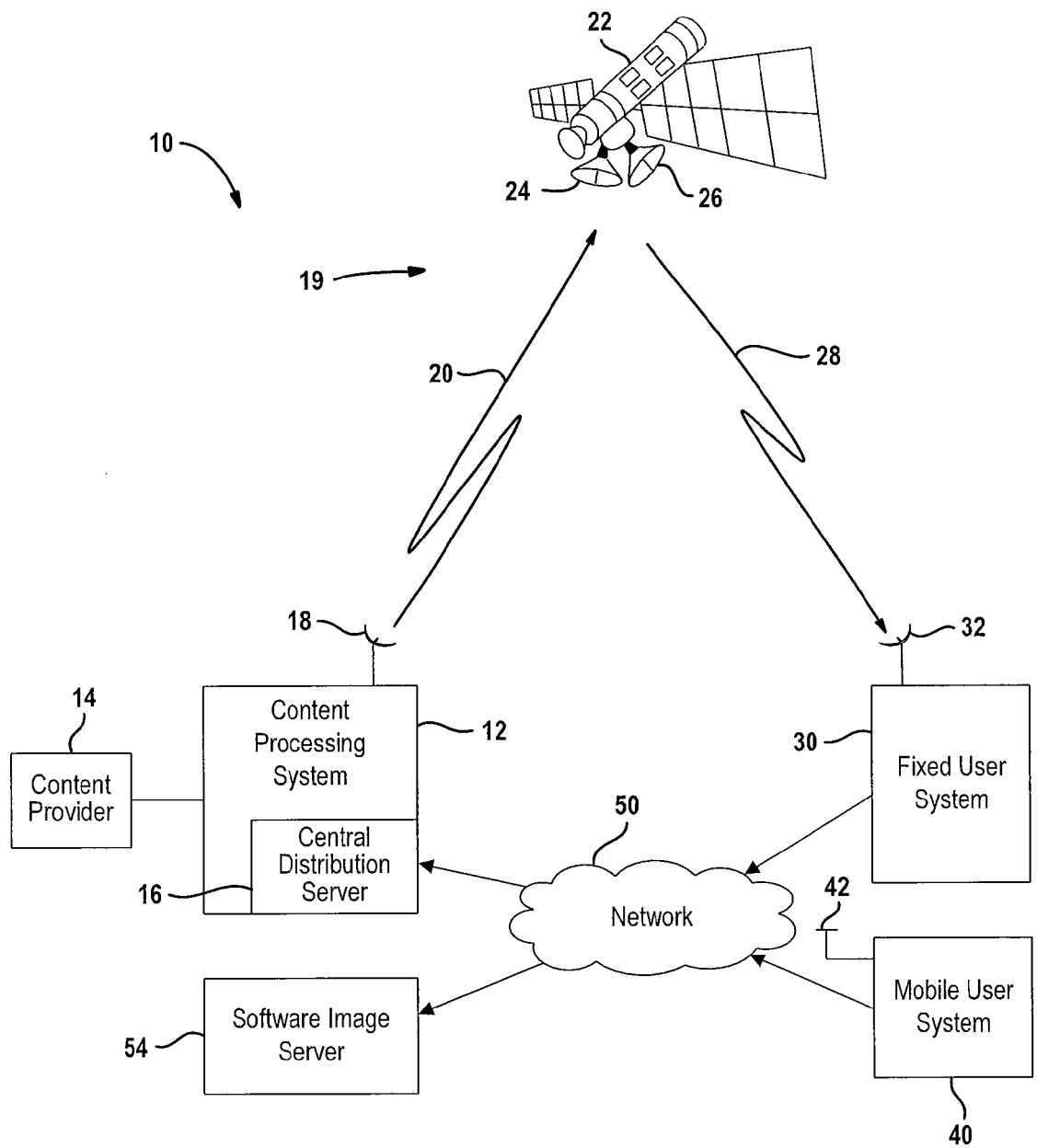
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol—(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
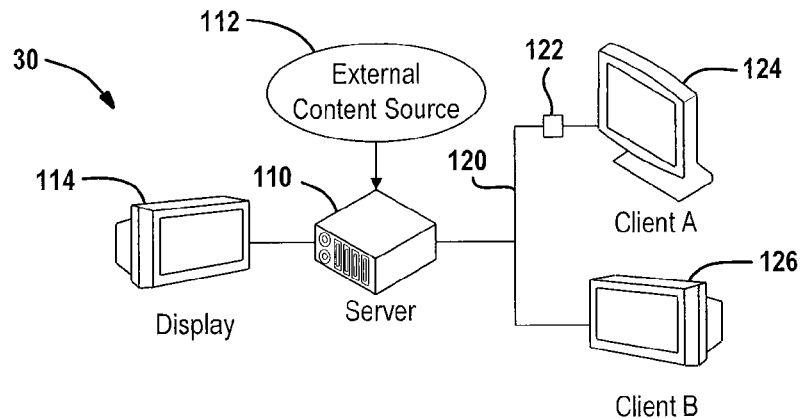
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
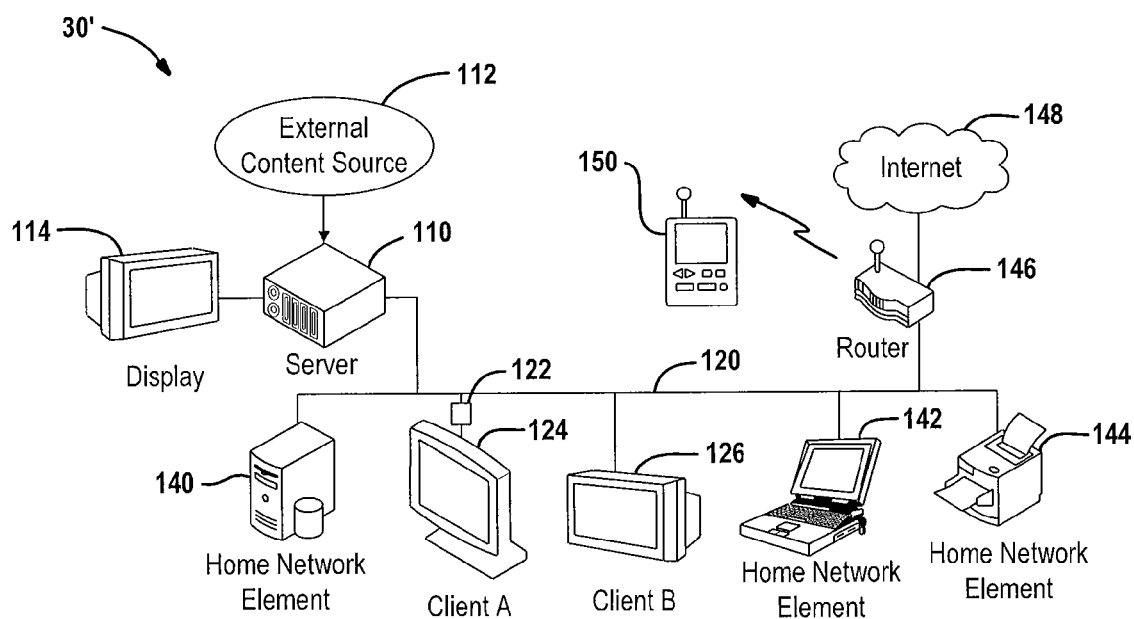
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
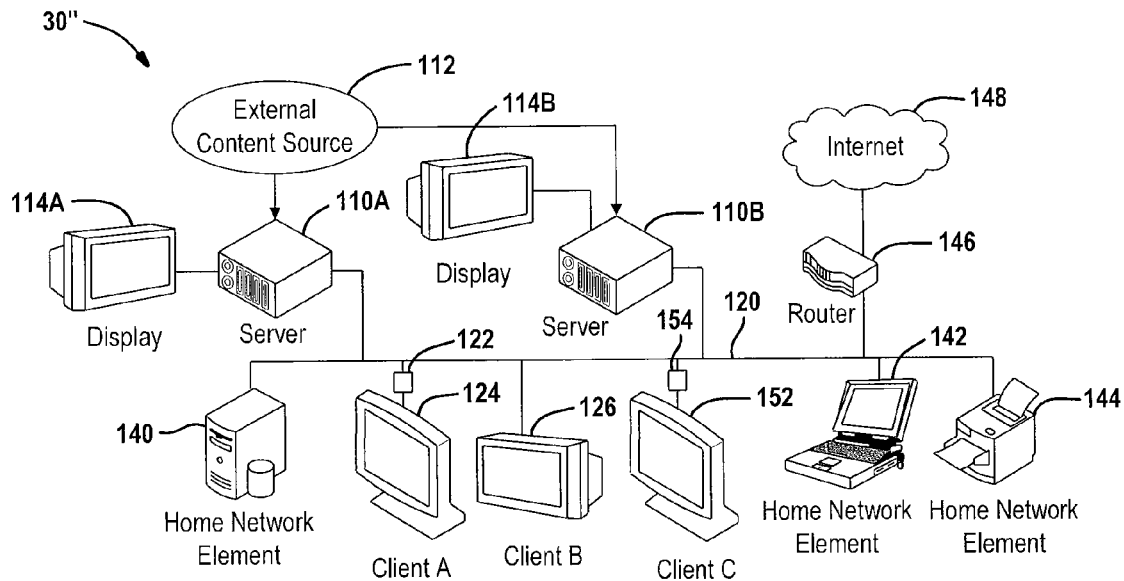
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
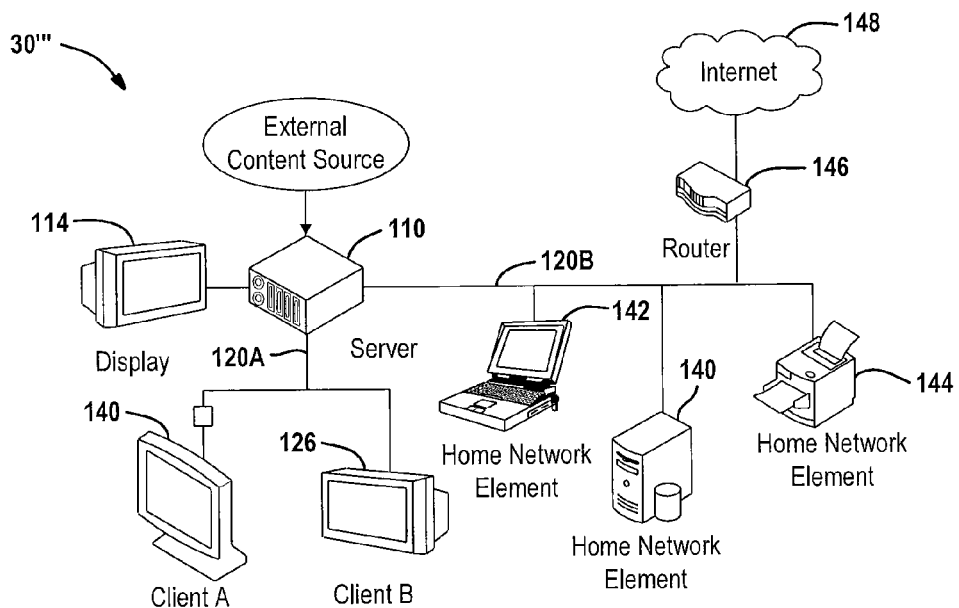
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
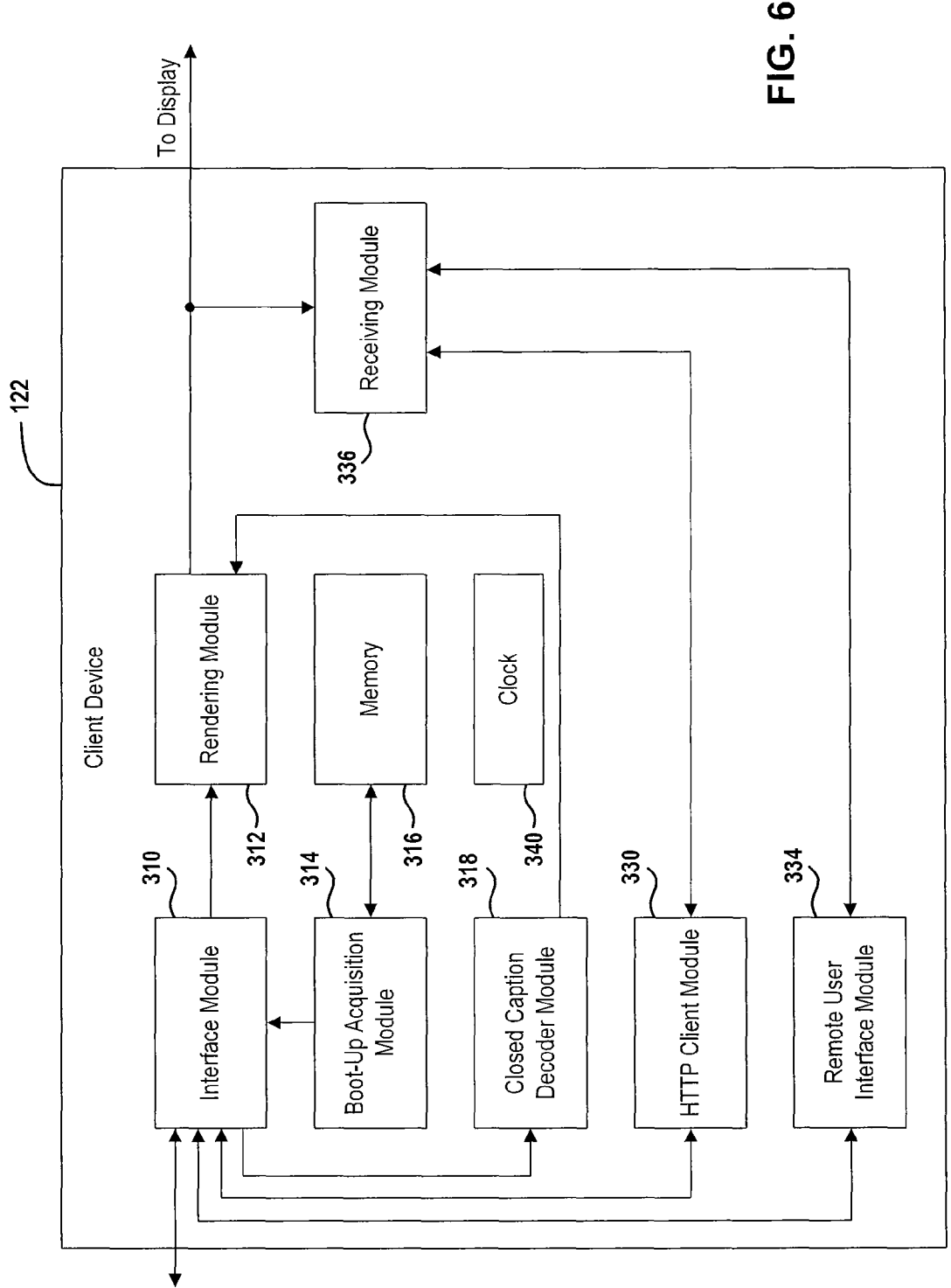
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. The rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
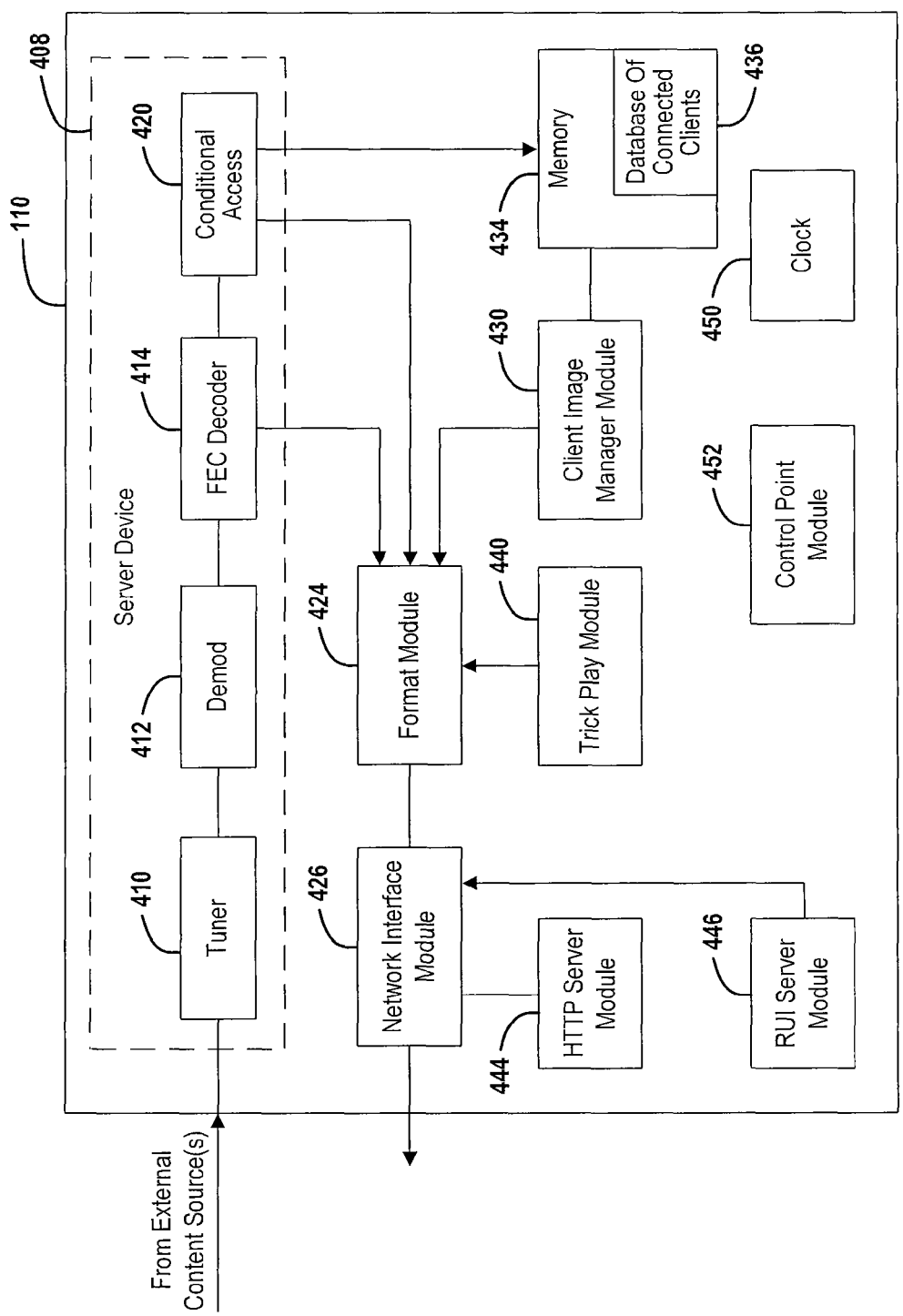
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate comments to control pixels at different locations of the display.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

Figure 8:
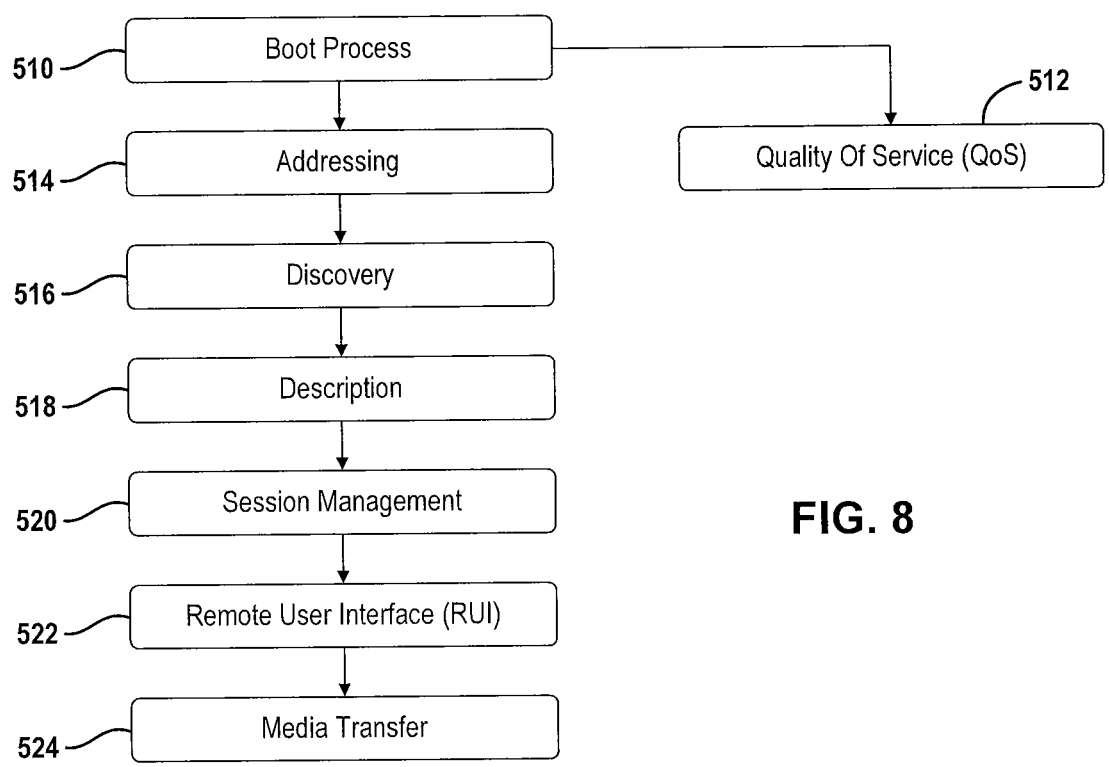
FIG. 8 is a high level flowchart of a method for operating the network topology.

Referring now to FIG. 8, a high-level method of operating the client and servers is illustrated. When the system is first operated, a boot process 510 may be employed. The boot process may be employed to boot a new client. The boot process may provide a boot software image to the client devices from the server.

In step 512, the quality of service (QOS) may also be managed by the system. This may be in connection with the boot process or separate from the boot process. The quality of service may be monitored so that a desired quality throughout the process is maintained. It should be noted that the quality of service step 512 may continually operate during all of the individual processes described below.

In step 514, the addressing of the client and server is performed. IP addresses for the client and the server may be exchanged in this step. This allows the client devices and home network devices within the network to communicate therebetween and communicate with the server or servers.

In step 516, a discovery of the devices may be performed. The discovery may include advertisement of devices or various services that can be performed by various devices of the network.

In step 518, a description of the various devices or services may be exchanged. An exchange of full service and device information between the server and client may be performed. In step 520, session management may be performed. Session management may include establishment of a remote user interface connection between the client and server. In step 522, the remote user interface may be communicated between the client and server providing user interface graphics and audio to the clients from the server.

In step 524, media transfer may also be performed. Media transfer of renderable data may be performed from the server to the client. That is, the various types of content, such as video, audio and data may be provided in a renderable form to the client from the server. The client device may render the data for display. The data is provided in a predetermined format to the device so the client device merely has to display the data or content after rendering. The rendering may take place on a display area such as by a pixel-by-pixel basis or other display coordinate basis. By rendering the data, decoding of the data is not required at the client device. This allows a consistent customer experience between various devices in various networks and between various devices within a network. Consistent quality may thus be achieved.

Figure 9:
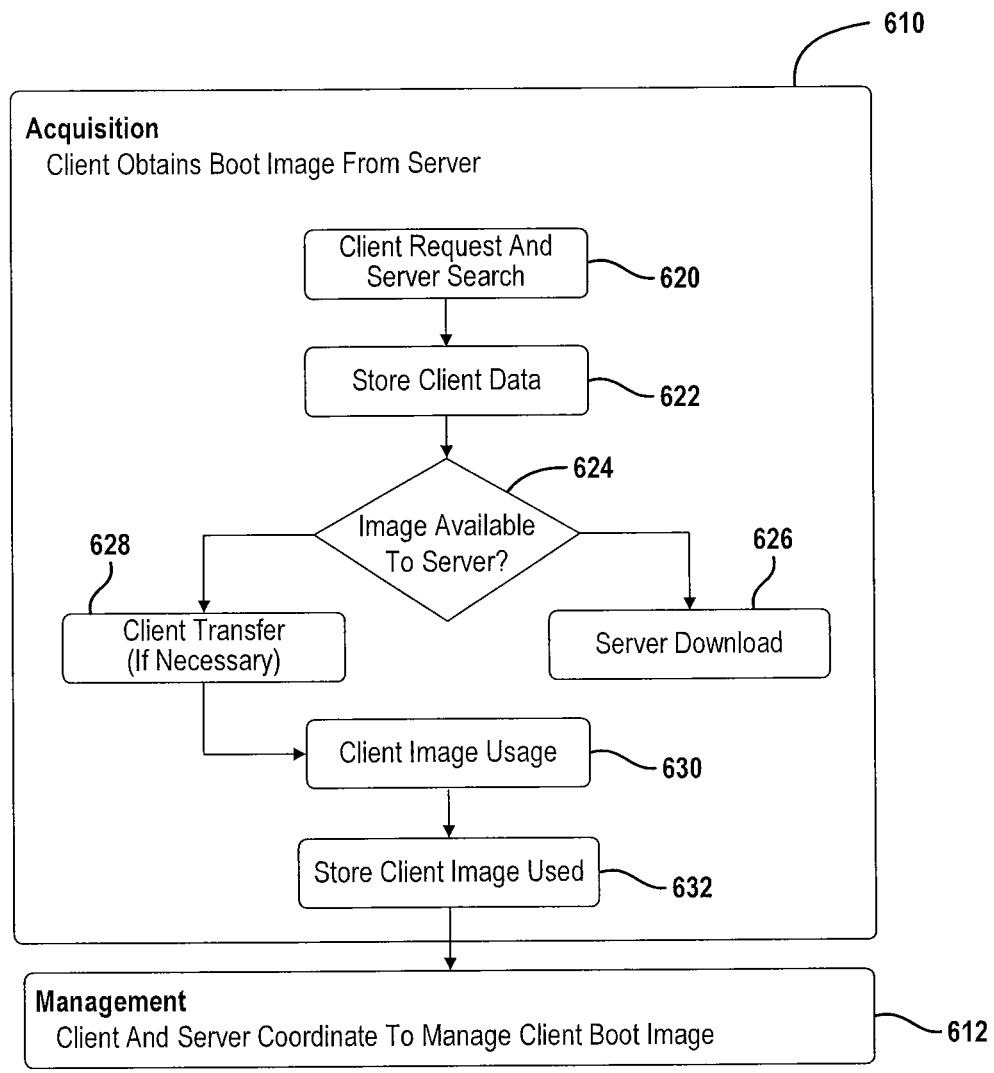
FIG. 9 is a flowchart of a method for performing client image acquisition.

Referring now to FIG. 9, a client image acquisition (CIA) process is illustrated. The client image acquisition process enables client devices to acquire an executable boot image from the server device. Client image acquisition defines how a client requests and acquires its boot image and checks for a new boot image and is notified when one exists. Client devices may not be required to use a client image acquisition protocol. The servers may use the client image acquisition protocol so that various types of clients may be serviced if they employ the client image acquisition protocol.

The client image acquisition process may be divided generally into two groups of steps: acquisition steps 610 and a management step 612. In the acquisition steps 610, the client obtains the boot image from the server. In the management step 612, the client and server coordinate to manage the client boot image. Further details of the client image acquisition process and the management process are set forth below.

The acquisition steps 610 may include a client request and server search step 620. The client request and server search step 620 generate a client request signal from a client device when the client device is incorporated into a network. When a new client device is determined by the server, step 622 stores the client data within the server. The client data may include the model number and serial number of the device as well as any other identifying information such as information related to the boot image, such as if one is stored within the device. The client data may be stored within a database within the server.

In step 624, it is determined whether or not a software image is available to the server. If there is no image available to the server in step 626, the server downloads images. After the server downloads images, a communication signal may be provided from the server to the client and thus another client request may be generated in step 620.

Referring back to step 624, if an image is available to the server, step 628 transfers the image to the client through the local area network. After step 628, the client image may be used in step 630. Also, step 632 may store the client image used within the server in the event that an update becomes available.

After step 632, step 612 may be performed. This corresponds to the management of the system. Details of the management process will be described below.

Figure 10:
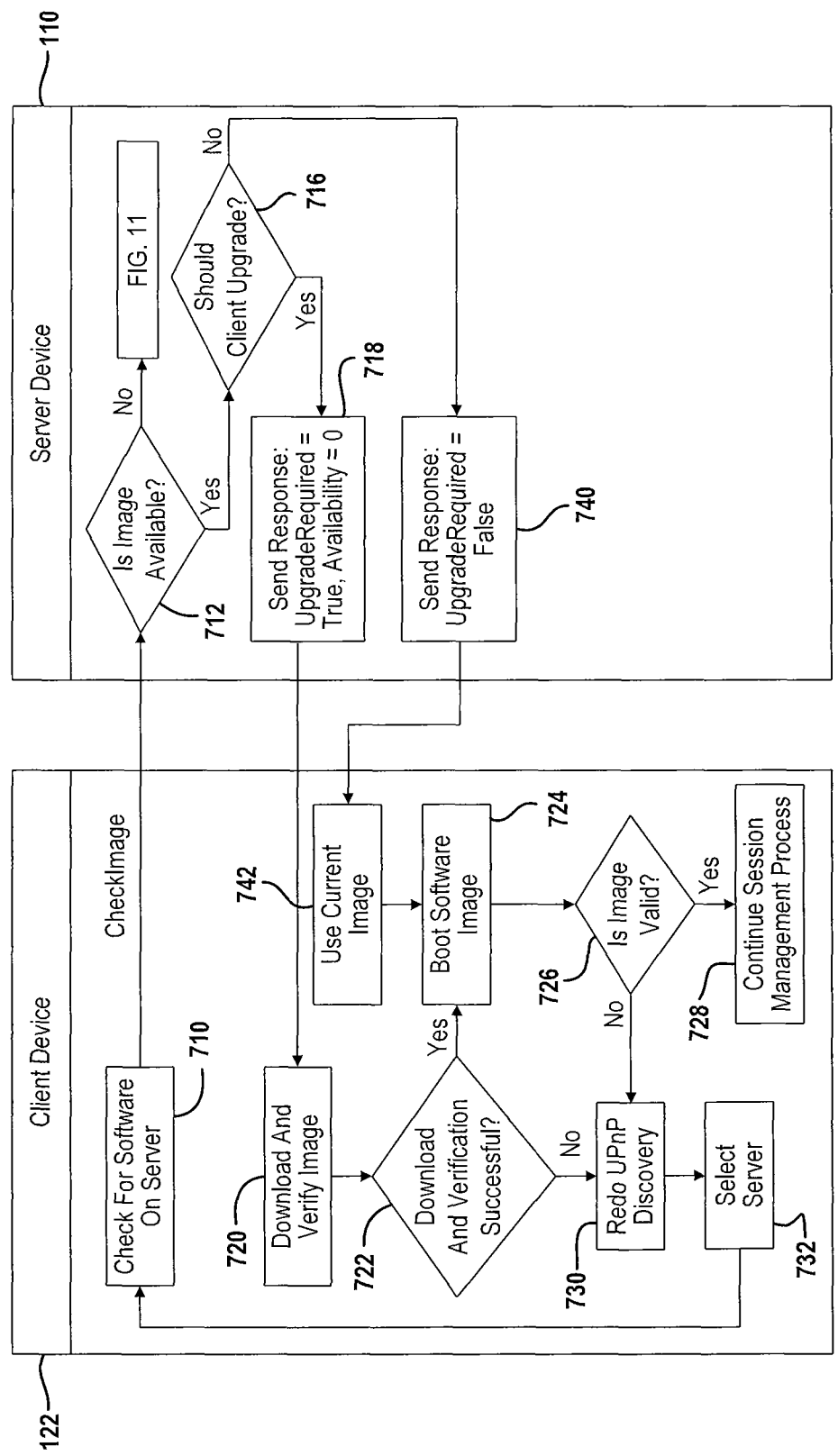
FIG. 10 is a flowchart of a method for initializing process if a boot image for the client is available at the server.

Referring now to FIG. 10, the server 110 and the client 112 are illustrated with corresponding steps for a method of an initialization process if a boot image is available to the server 110. The server 110 may use the client image manager of FIG. 7 for performing the steps set forth in FIG. 10. The client image manager provides a control and notification message to a client device for maintaining client software images. Clients may be provided with notifications about events of concern. Upon receiving notification, the client may request instructions from its associated server on how to proceed or a client can make requests of its own if internal logic requires.

In step 710, a check image signal is generated by the client to check for software on the server. The check image signal may include identifiers or strings of identifies for the make, model, hardware revision, major software revision, minor software revision, and download location. The make is the manufacturer of the client device. The client device keeps this string constant and is part of a unique identifier for the client device. The model is the model of the client device. This string is also kept constant as part of a unique identifier for the client device. The hardware revision is a string representing the revision of the hardware of the client device which is also kept constant. The major software image version and minor software version are the major software image version and minor software image version of the software that is currently running on the client device. This string may change as the software image changes. An indicator such as zero may provide an indication that the client device has no boot image. The download location is a download location that the client device provides to the server when the client image is available for download should the server device decide to use it. This will be described further below.

In step 712, the server device determines whether an image is available based upon the check image signal. If no image is available, the steps of FIG. 11 may be performed which are further described below. If an image is available, step 716 is performed. Step 716 determines whether a client should upgrade. If a client should upgrade, step 718 is performed. In step 718, it is determined whether an upgrade is required. If an upgrade is required and the image is available, a response signal is sent to the client device 122. A response may include various parameters including a file path which is the fully qualified file path on the device-associated server where the boot image may be found in the home directory of the server 110. The server device 110 may use the trivial file transfer protocol (TFTP) server module illustrated in the server of FIG. 7 above for communicating the boot image. The response signal from the server may also include whether an upgrade is required. If the upgrade require is true, an upgrade to the boot image is required at the destination that corresponds to the server file path. An availability indicator may also be provided in the response. The availability indicator indicates the current availability status of the client software image. Availability indicators may be provided to indicate that the boot image is available at the file path indicated, that a boot image is not currently available and that the server device 110 may attempt to acquire the image, or that the boot image is not currently available and the server will not make an attempt to acquire it. An urgent flag may also be provided within the response from the server to the client device 122. If an urgent flag or indicator is true, the client must immediately use the image available at the server. If the urgent flag is not true, the client may delay using the new image.

In step 720, the image is downloaded and verified by the client device 122 using the file path provided within the response. If the download and verification is successful in step 722, the client is booted using the boot software image in step 724. A check is performed in step 726 to determine whether or not the image is valid. If the image is valid, the session continues using the session management process in step 728. In step 726, if the image is not valid or in step 722 if the download and verification is not successful, step 730 may perform a discovery process. The discovery process may be performed using a universal plug and play (UPnP) discovery signal. In step 732, if there is a choice of a server device, one of the server devices may be selected. A different server may be selected if more than one is available than the previous image.

Referring back to step 716, should a client upgrade not be available, step 740 generates a response that an upgrade is not required. After step 740, the client uses the image that is currently available within the client. Thereafter, steps 724 through 732 are performed as described above.

Figure 11:
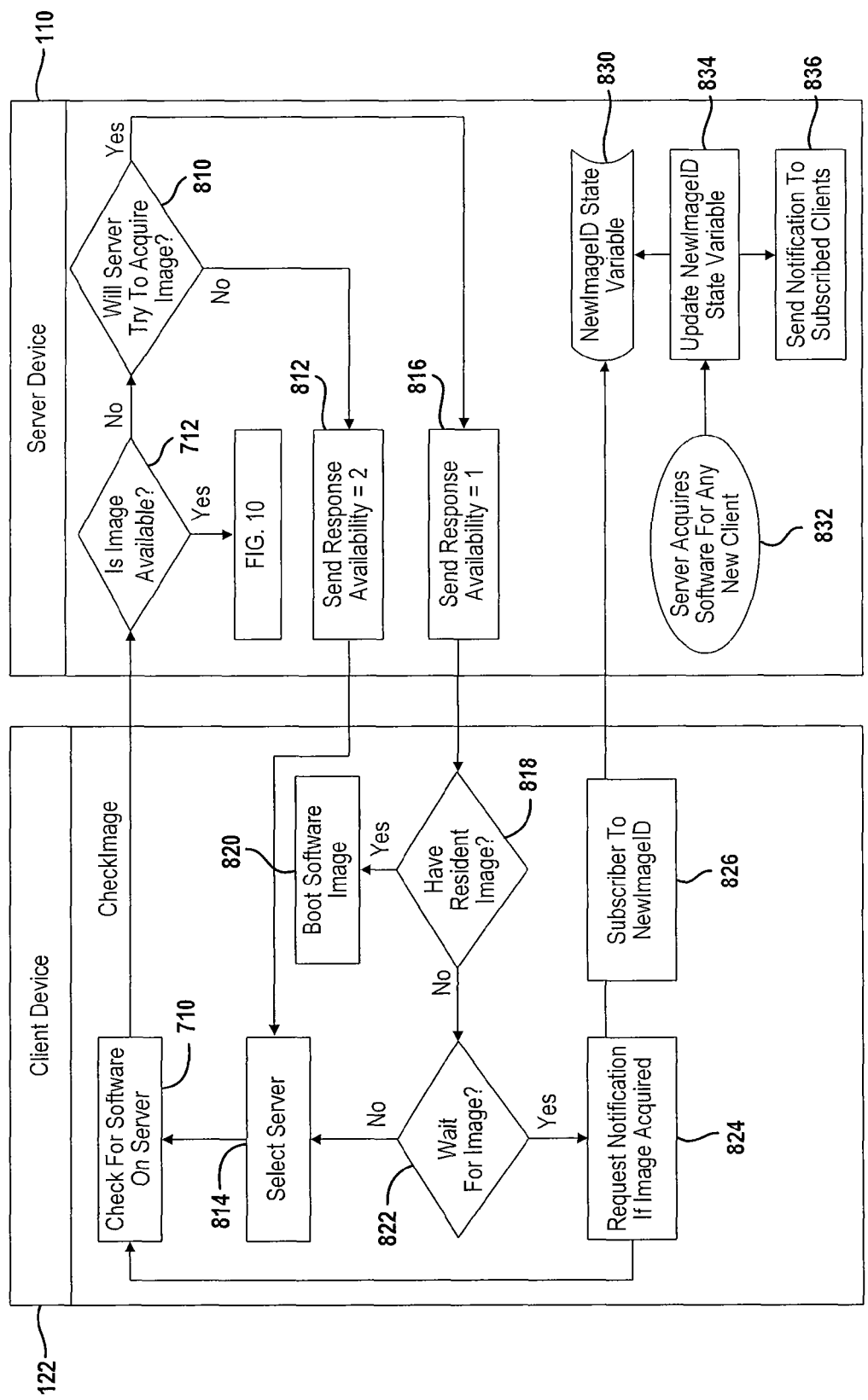
FIG. 11 is a flowchart of a method where the boot image for the client is not available to the server.

Referring now to FIG. 11, an example of an initial client content with the server where a boot image for the client is not available is set forth. The client 122 and the server 110 are illustrated in a similar manner to FIG. 10 above. Steps 710 and 712 are identical. Except that step 714 of FIG. 10 has now been expanded when the image is not available. The YES result of step 712 corresponds to FIG. 10. After step 712, when an image is not available, step 810 determines whether the server will try to acquire an image. If the server will not try to acquire an image, step 812 sends a response corresponding to an availability that a boot image is not currently available and the server will not make an attempt to acquire it. Another server may be selected in step 814 and then steps 710 and 712 are repeated.

In step 810, if the server will try to acquire an image, a response corresponding to "a boot image not being available but the server may attempt to acquire it," may be performed in step 816. After step 816, step 818 may determine whether the image is resident on the client device 122. If the image is resident on the client device, step 820 boots the resident software image. If no image is resident in step 818, step 822 waits for an image. If in step 822 the image is not going to be waited for, step 814 is again performed. If an image is going to be waited for in step 822, step 824 requests a notification if an image is acquired. In step 825, if the client is not already subscribed to the image step 826 is performed. If the client is subscribed to the image, step 710 may be performed. In step 826, the client may subscribe to a new image identifier. The new image identifier may be a variable such as a two-byte variable that is used for notifying clients that a new software image has been acquired for distribution by the server 110. A server may also update the state variable to force all subscribed clients to verify that they still meet the server client image requirements. A client may subscribe to this variable when trying to acquire an image for use when the server device does not have a software image for the client device. When the server device acquires a software image for the client device, the value of the new image identifier may be changed. The server device may notify the client. In step 830, the state variable may be changed from the server to indicate the acquisition of the image. In step 832, the server may acquire software for any new client. In step 834, the new image identifier state variable may be changed. This changes the state variable in step 830. After the new image identifier is changed, step 836 may send a notification to subscribed client devices. After step 836, step 712 may allow the client device to check for new software images on the server device. Each time a new image is obtained, the server device may notify the client device so that the client device may generate a check image signal in step 710.

Figure 12:
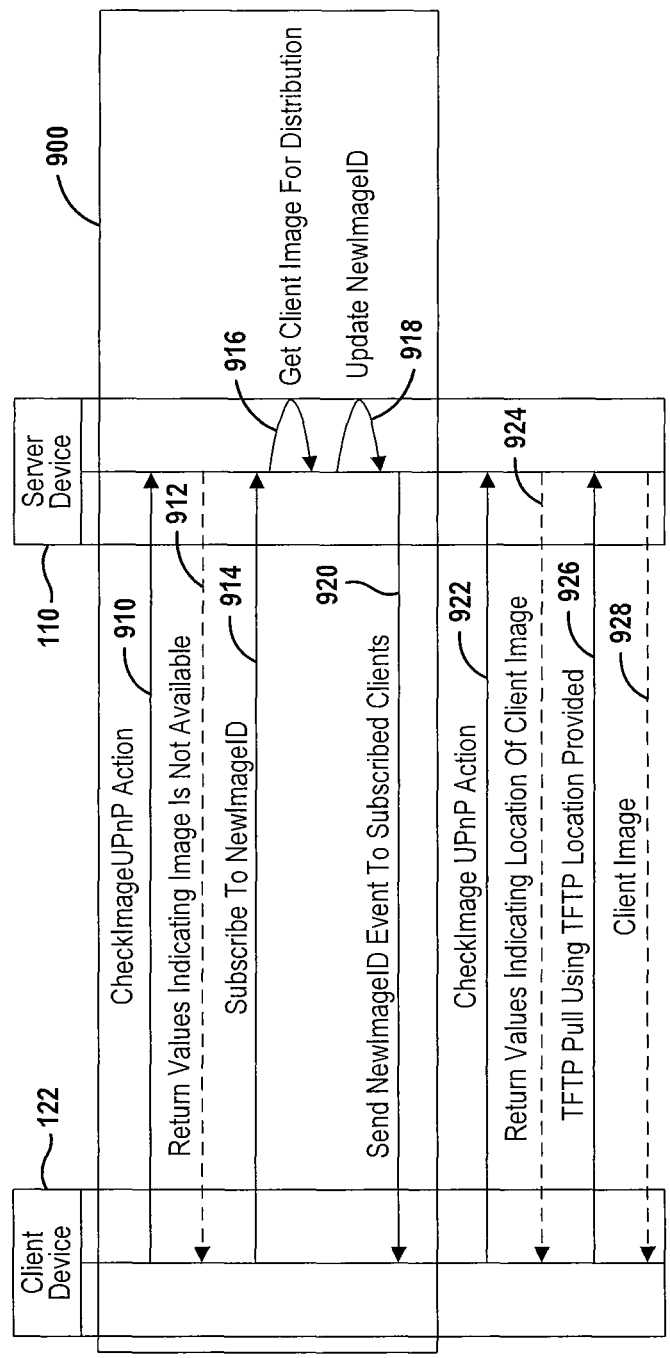
FIG. 12 is a sequence chart between the client and server for a method of the initial image acquisition process.

Referring now to FIG. 12, the steps corresponding to an initial image acquisition process are illustrated. The steps within box 900 repeat until the server acquires an image. The last four steps are performed when the server acquires a new software image.

In step 910, a check image signal is generated. This may be in the form of a universal plug and play (UPnP) action. In step 912, values indicating that the image is not available may be returned from the server to the client. In step 914, the client may subscribe to a new image identifier. Step 916 is performed when the server gets the image for distribution. Step 918 updates the new image identifier and step 920 sends a new image identifier event signal to subscribed clients. The subscribed clients are the clients that are available on the local area network that subscribed to the new image identifier. These may also be narrowed down by clients that correspond to the new software image.

Step 922 generates a check image identifier that may also be a universal plug and play action. The check image signal may generate return values from the server that may be in a UPnP protocol format indicating the location of the client image in step 924. In step 926, the client may generate a pull signal in the trivial file transfer protocol (TFTP) format using the TFTP location provided by the server. In step 928, the client image is provided from the server to the client. Thereafter, the client may use the client image for booting the client. It should be noted that a request or action is provided in solid lines, whereas a response is provided in dotted lines.

Figure 13:
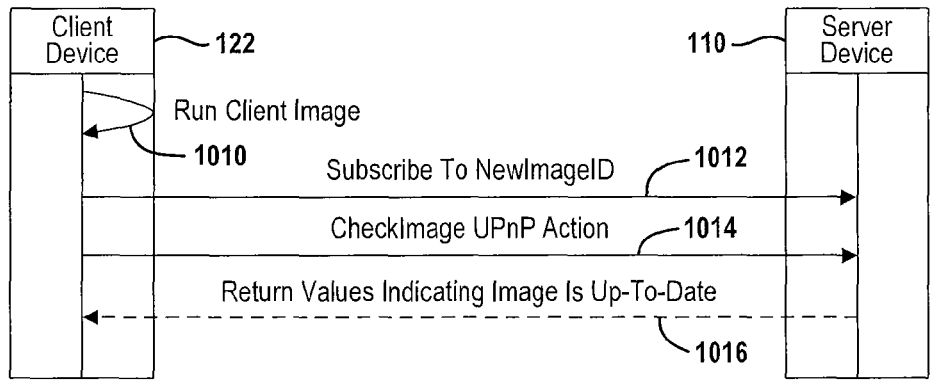
FIG. 13 is a sequence chart of a method for image maintenance initialization.

Referring now to FIG. 13, an example of image maintenance initialization where the server does not have an image for the client during initialization is illustrated. In step 1010, the client image resident within the client is run. In step 1012, a client may subscribe to a new image identifier. Check image actions may be performed periodically and, as mentioned above, may be in a universal plug and play action format. The check image identifier is communicated to the server in step 1014. Step 1016 returns values that indicate that an image is up-to-date. Steps 1010 through 1016 may be performed periodically.

Figure 14:
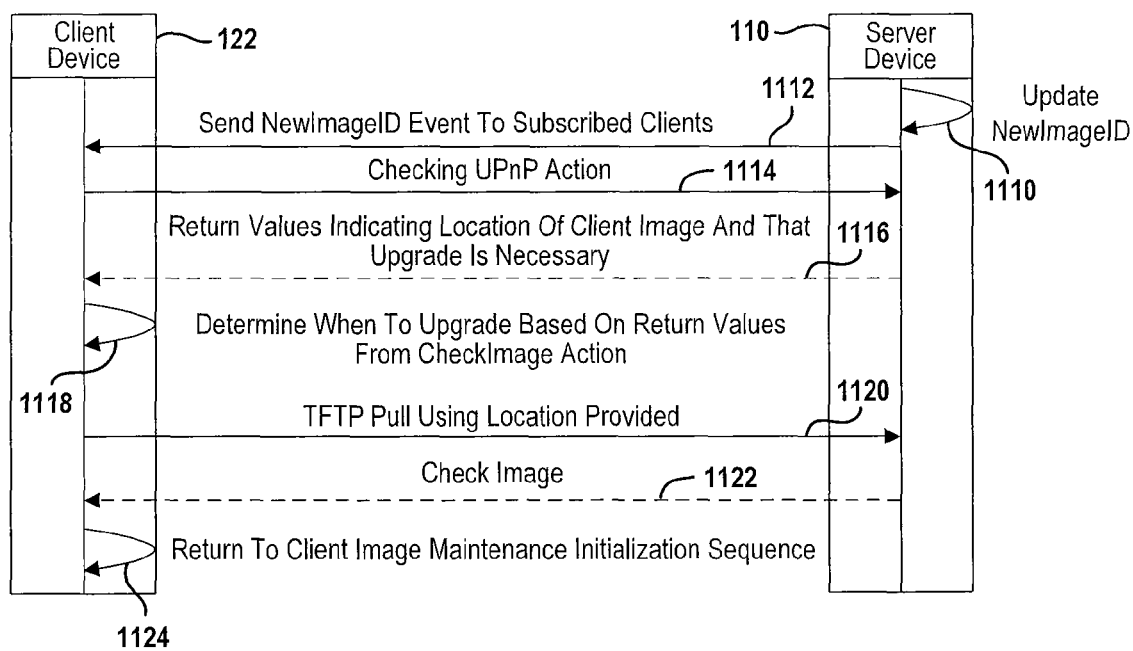
FIG. 14 is a sequence chart of a method for maintaining the client image after a client obtains a new boot image for the client.

Referring now to FIG. 14, a method for maintaining the client image starting at the point where the server gets a new boot image for the client is set forth. In step 1110, the new image identifier is updated. In step 1112, the new image identifier is communicated to subscribed clients. The new image identifier that is communicated from the server to the client causes the client to generate a check image signal that is communicated from the client to the server. Return values from the server may indicate a location using the UPnP protocol format and that an upgrade is necessary in step 1116. Step 1118 determines within the client when an upgrade is to be performed based upon the return values from the check image action. In step 1120, the client device 122 generates a pull signal in the TFTP format using the location provided in step 1116. The server 110 communicates the client image to the client device 122 in step 1122. After the client image is stored within the client device, the client device operates using the updated software image. In step 1124, client image maintenance initialization sequence may be performed. The maintenance initialization is illustrated in FIG. 13.

Figure 15:
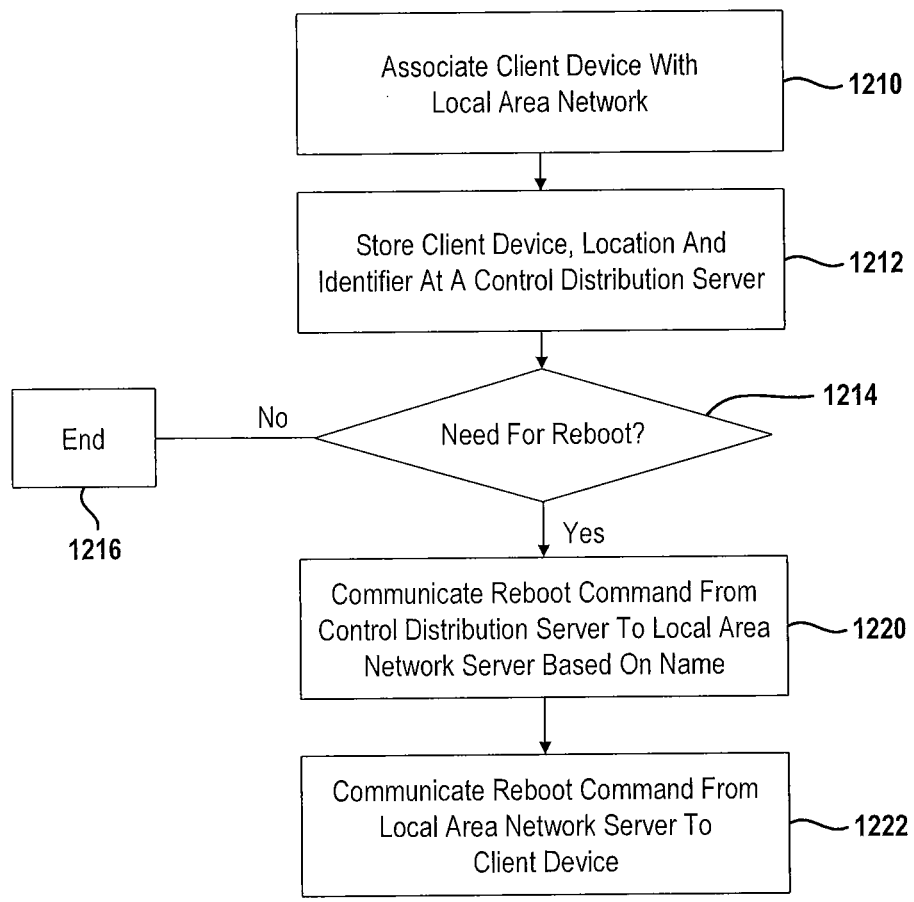
FIG. 15 is a flowchart of a method for rebooting the client from a central distribution server.

Referring now to FIG. 15, the system may be used for rebooting a client within a local area network from the central distribution server 16 of FIG. 1. In step 1210, the client device is associated with the local area network. The client device may communicate various information such as the make, model, hardware revision, major software revision, minor software revision and a download location upon initial association with the client device with the local area network. The client device data may be stored within a database of a server associated with the local area network.

In step 1212, the client device data may also be stored at a central distribution server. The client device identifier and network may be stored and not the entire client device data. The central distribution server, as mentioned above, may be associated with the central processing system. The central distribution server may be contacted using a network or may be contacted using a voice system that is used for contacting client service. In step 1214, the need for a reboot is determined. When a reboot is not required, step 1216 ends the process. In step 1214, when a reboot is required, step 1220 is performed. A need for a reboot may be performed when a customer service agent or other device at the central distribution service determines an error is possible. By allowing the central distribution server to reboot a client within the local area network, troubleshooting the system may reduce operator error at the client device. When a reboot is determined in step 1214, step 1220 communicates a reboot command from the central distribution server to the local area network server based upon the client device name. In step 1222, a reboot command is generated from the server and communicated through the local area network to the client device. The advantage of this system is that the central distribution server does not need to connect to each client. Rather, only a one-way connection may be required from the central distribution server to the local area network server. This saves hardware and software costs associated with creating a link between each client device and the central distribution server. It also allows the central distribution server to reboot a variety of client devices with no specific information about the client device other than its assigned device name on the local network server. This saves costs at the central distribution server by allowing it to use the same software and hardware no matter what the client is as long as the client is capable of following the methods above.

Figure 16:
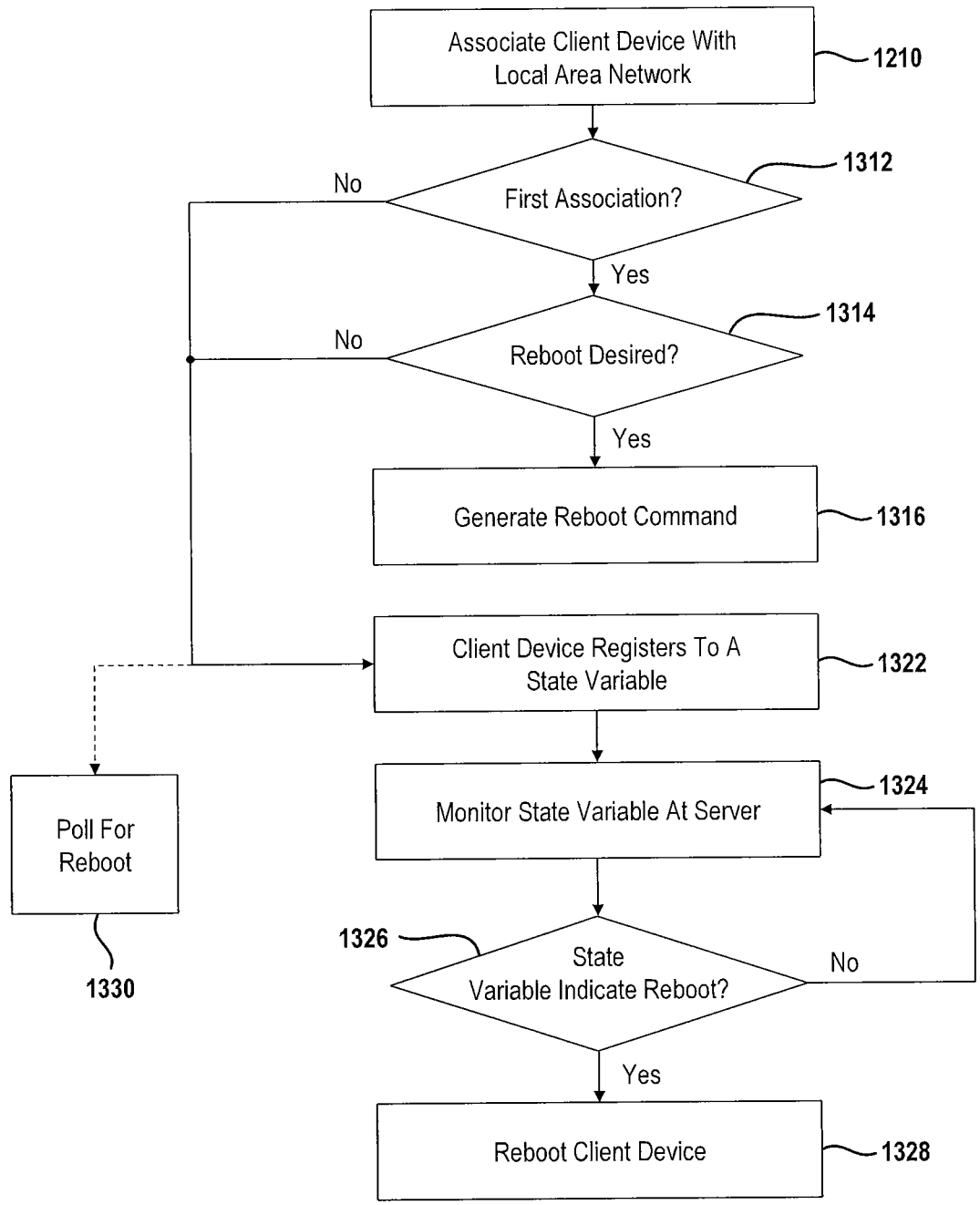
FIG. 16 is a flowchart of a method for determining a reboot from a client.

Referring now to FIG. 16, a corollary method to the method of FIG. 15 is set forth. In FIG. 16, a mechanism for the server to reboot the client on its local area network is provided.

In step 1310, the client device is associated with a local area network. As mentioned above, various data may be provided by the client device when associating with the local area network. The client device may provide a client identifier that may include a make, model, hardware revision, major software revision, minor software revision, and a download location during the association. The database may be formed in the server with the client information. In step 1312, if the client is performing its first association in step 1312, step 1314 determines whether a reboot is desired. If a reboot is desired based upon the client data, step 1316 is performed which generates a reboot command. In step 1312 if this is not the client's first association and in step 1314 if a reboot is not desired, step 1322 may be performed. Step 1322 allows the client device to register to a state variable. In step 1324, the client device monitors the state variable at the server. In step 1326, if the state variable indicates that a reboot is desired, the re-client device is rebooted in step 1328. In step 1326, if a reboot is not desired as indicated by a state variable, step 1324 may again be performed.

Referring back to steps 1312 and 1314, an optional step may also be performed by the client polling may be provided in step 1320 or in 1330 rather than registering for a state variable. In step 1330, the client device may periodically poll the server device to determine if a reboot is desired. Polling has the disadvantage of requiring client device resources for performing the polling. Steps 1322 through 1328 allow the server to notify the client when the state variable changes rather than the client monitor continually monitoring the state variable in the polling step of step 1330.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    storing a software image on a server device;
    communicating a check image signal having a client device identifier to the server device through a network, said client device identifier comprising a client device model identifier, a client device make identifier or a software revision identifier;
    communicating a software image identifier to the client device from the server device in response to the check image signal, said software image identifier comprising an image location;
    at the client device, requesting the software image from the server device using the image location of the software image identifier;
    communicating the software image to the client device through the network based on the image location; and
    operating the client device based on the software image.

2. The method as recited in claim 1 further comprising associating the software image with the client device within the server device.

3. The method as recited in claim 2 further comprising determining an upgrade software image availability in response to associating.

4. The method as recited in claim 1 wherein communicating the check image signal having the client device identifier comprises communicating the check image signal having the client device identifier and an external network address.

5. The method as recited in claim 4 wherein communicating the software image comprises communicating the software image from a software image server based on the external network address from the server device to the client device.

6. The method as recited in claim 1 wherein storing the software image comprises storing a boot software image.

7. The method as recited in claim 1 wherein communicating the check image signal comprises communicating the check image signal using a UPnP format.

8. The method as recited in claim 1 wherein communicating the check image signal includes communicating client device model identifier or client device make identifier or both.

9. The method as recited in claim 1 further comprising storing an updated image within the server device, communicating a new image signal to the client device in response to the updated image, and generating a second check image signal at the client device; wherein communicating the software image from the server device comprises communicating the software image from the server device in response to the second check image signal.

10. The method as recited in claim 9 further comprising communicating the image location from the server device to the client device in response to the second check image signal.

11. The method as recited in claim 10 further comprising generating a pull signal from the client device based on the image location signal.

12. The method as recited in claim 1 further comprising generating a new image identifier at the client device and wherein communicating a client device identifier comprises communicating the client device identifier in response to the new image identifier.

13. The system as recited in claim 1 wherein the client device generates a pull signal based on the image location.

14. A system comprising:
a server device that stores a software image therein;
a client device that communicates a check image signal having a client device identifier to the server device through a network, said client device identifier comprising a client device model identifier, a client device make identifier or a software revision identifier;
said server communicating a software image identifier to the client device in response to the check image signal, said software image identifier comprising an image location;
said client device requesting a software image from the server device using the image location of the software image identifier;
wherein said server communicates the software image to the client device through the network from the image location in response to the software image identifier; and
wherein said client device operates based on the software image.

15. The system as recited in claim 14 wherein said server associates the software image with the client device within the server device.

16. The system as recited in claim 15 wherein said server determines an upgrade software image availability when the server associates the software image with the client device within the server.

17. The system as recited in claim 14 wherein the check image signal comprises the client device identifier and an external network address.

18. The system as recited in claim 17 further comprising a software image server external to the local area network communicating the software image based on the external network address to the server device.

19. The system as recited in claim 14 wherein the software image comprises a boot software image.

20. The system as recited in claim 14 wherein the check image signal is in a UPnP format.

21. The system as recited in claim 14 wherein the check image signal comprises a client device model identifier and a client device make identifier.

22. The system as recited in claim 14 wherein communicating the check image signal includes communicating at least two of client device model identifier, client device make identifier and software revision identifier.

23. The system as recited in claim 14 wherein the server device stores an updated image therein and communicates a new image signal to the client device in response to the updated image; wherein the client device generates a check image signal at the client device in response to the new image signal; and wherein said server communicates the software image to the client device in response to the check image signal.

24. The system as recited in claim 14 wherein the client device comprises a rendering device.

25. The system as recited in claim 14 wherein the server device receives television signals and communicates renderable television signals to the client device through the network.

* * * * *